(12) United States Patent
Cocilovo et al.

(10) Patent No.: US 12,742,919 B1
(45) Date of Patent: Sep. 22, 2026

(54) OPTICAL SYSTEM WITH WAVEGUIDE REDIRECTING REFLECTOR

(71) Applicant: Apple Inc., Cupertino, CA (US)

(72) Inventors: Byron R Cocilovo, Boulder, CO (US); Scott M DeLapp, San Diego, CA (US); Se Baek Oh, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 354 days.

(21) Appl. No.: 18/349,818

(22) Filed: Jul. 10, 2023

Related U.S. Application Data

(60) Provisional application No. 63/389,230, filed on Jul. 14, 2022.

(51) Int. Cl.

| | |
|---|---|
| ***F21V 8/00*** | (2006.01) |
| ***G02B 5/32*** | (2006.01) |
| ***G02B 27/00*** | (2006.01) |
| ***G02B 27/01*** | (2006.01) |
| ***G02B 27/18*** | (2006.01) |

(52) U.S. Cl.
CPC ............. *G02B 6/0018* (2013.01); *G02B 5/32* (2013.01); *G02B 6/0016* (2013.01); *G02B 6/0026* (2013.01); *G02B 6/0031* (2013.01); *G02B 27/0081* (2013.01); *G02B 27/0172* (2013.01); *G02B 27/18* (2013.01)

(58) Field of Classification Search
CPC ........ G02B 27/0172; G02B 2027/0178; G02B 27/0081; G02B 2027/0125; G02B 2027/0174; G02B 6/0028; G02B 6/0016; G02B 2027/0123; G02B 6/0055; G02B 2027/0118; G02B 6/00; G02B 27/4272; G02B 6/0031; G02B 6/34; G02B 6/0018; G02B 2027/0116
See application file for complete search history.

(56) References Cited

U.S. PATENT DOCUMENTS

| | | | | |
|---|---|---|---|---|
| 11,796,729 | B2 * | 10/2023 | Eisenfeld | G02F 1/3137 |
| 11,994,672 | B2 * | 5/2024 | Pfeiffer | G02B 27/0081 |
| 11,994,681 | B2 * | 5/2024 | Bhakta | G02B 6/0018 |
| 12,360,373 | B1 * | 7/2025 | Bhakta | G02B 27/0172 |
| 2017/0205618 | A1 * | 7/2017 | Basset | G02B 23/2423 |
| 2018/0210202 | A1 * | 7/2018 | Danziger | G02B 5/30 |

(Continued)

FOREIGN PATENT DOCUMENTS

| | | | | |
|---|---|---|---|---|
| EP | 4027187 A1 * | 7/2022 | | G02B 6/423 |
| WO | WO-2020243111 A1 * | 12/2020 | | G02B 27/0101 |
| WO | 2022020515 A1 | 1/2022 | | |

*Primary Examiner* — Michelle R Connelly
(74) *Attorney, Agent, or Firm* — Treyz Law Group, P.C.; Michael H. Lyons

(57) ABSTRACT

A display system may include a waveguide, an input coupler, a cross-coupler, and an output coupler for displaying images to a user. A reflector may be disposed on the waveguide. The input coupler may couple light into the waveguide and towards the reflector. The reflector may reflect the light towards the cross-coupler. The cross-coupler may expand and redirect the light. The output coupler may direct the light towards an eye box. The reflector may allow the input coupler to be mounted at a peripheral portion of the waveguide that overlaps a display projector without portions of the field of view of the image light being cut off but the geometry of the waveguide and without causing the display system to be unnecessarily bulky or uncomfortable to wear.

11 Claims, 7 Drawing Sheets

(56) References Cited

U.S. PATENT DOCUMENTS

| | | | | |
|---|---|---|---|---|
| 2018/0252869 | A1 | 9/2018 | Ayres et al. | |
| 2019/0391393 | A1 | 12/2019 | Ayres et al. | |
| 2020/0257120 | A1 | 8/2020 | Genier et al. | |
| 2020/0310024 | A1* | 10/2020 | Danziger | G02B 6/0028 |
| 2020/0409156 | A1 | 12/2020 | Sissom et al. | |
| 2021/0294103 | A1 | 9/2021 | Klug et al. | |
| 2022/0004007 | A1* | 1/2022 | Bhakta | G02B 6/0018 |
| 2022/0011496 | A1* | 1/2022 | Bhakta | G02B 3/0087 |
| 2022/0066204 | A1 | 3/2022 | Pfeiffer et al. | |
| 2022/0066215 | A1* | 3/2022 | Nakamura | G02B 6/0028 |
| 2022/0269075 | A1* | 8/2022 | Yang | G02B 27/0103 |
| 2023/0099260 | A1 | 3/2023 | Nichol et al. | |
| 2023/0100029 | A1* | 3/2023 | Tsutsui | G02B 6/0028<br>385/31 |
| 2023/0204952 | A1* | 6/2023 | Ronen | G02B 27/0101<br>359/630 |
| 2023/0213769 | A1* | 7/2023 | Sharlin | G02B 27/0081 |
| 2023/0220214 | A1 | 7/2023 | Lifschitz Arribio et al. | |
| 2024/0103272 | A1* | 3/2024 | Peng | G02B 27/0172 |

* cited by examiner

OPTICAL SYSTEM WITH WAVEGUIDE REDIRECTING REFLECTOR

This application claims the benefit of U.S. Provisional Patent Application No. 63/389,230, filed Jul. 14, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance.

SUMMARY

An electronic device may have a display system for providing image light to an eye box. The display system may include a waveguide. An input coupler may couple image light into the waveguide. A cross-coupler may redirect the image light towards an output coupler and may expand a pupil of the image light. The output coupler may couple the image light out of the waveguide.

A reflector may be disposed on the waveguide. The input coupler may couple the image light into the waveguide and towards the reflector. The reflector may reflect the image light towards the cross-coupler. The reflector may be oriented orthogonal to a lateral surface of the waveguide or may be tilted at a non-orthogonal angle with respect to the lateral surface. The reflector may include multiple partially reflective layers or a single reflective layer. The reflector may be formed from an edge facet of the waveguide. The reflector may be formed in the same substrate as the cross-coupler or in a different substrate. The input coupler, cross-coupler, and output coupler may include prisms, volume holograms, mirrors (e.g., louvered mirrors), surface relief gratings, etc.

The reflector may allow the input coupler to be mounted at a peripheral portion of the waveguide that overlaps a display projector without portions of the field of view of the image light being cut off but the geometry of the waveguide and without causing the display system to be unnecessarily bulky or uncomfortable to wear.

DETAILED DESCRIPTION

Figure 1:
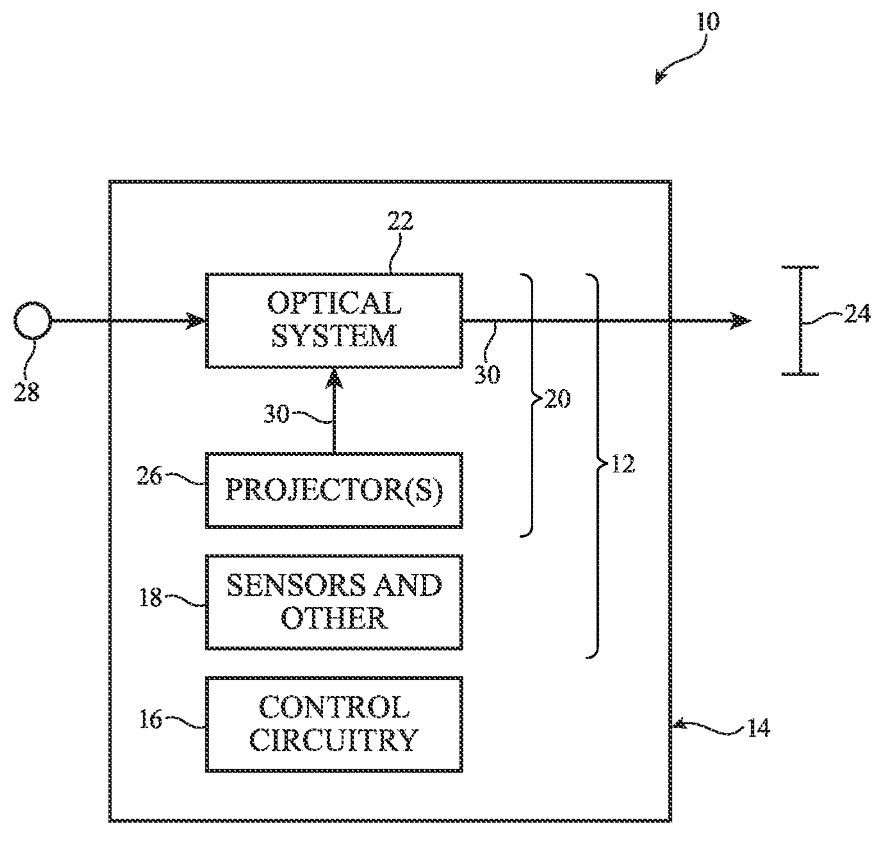
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world image light from real-world images or objects to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
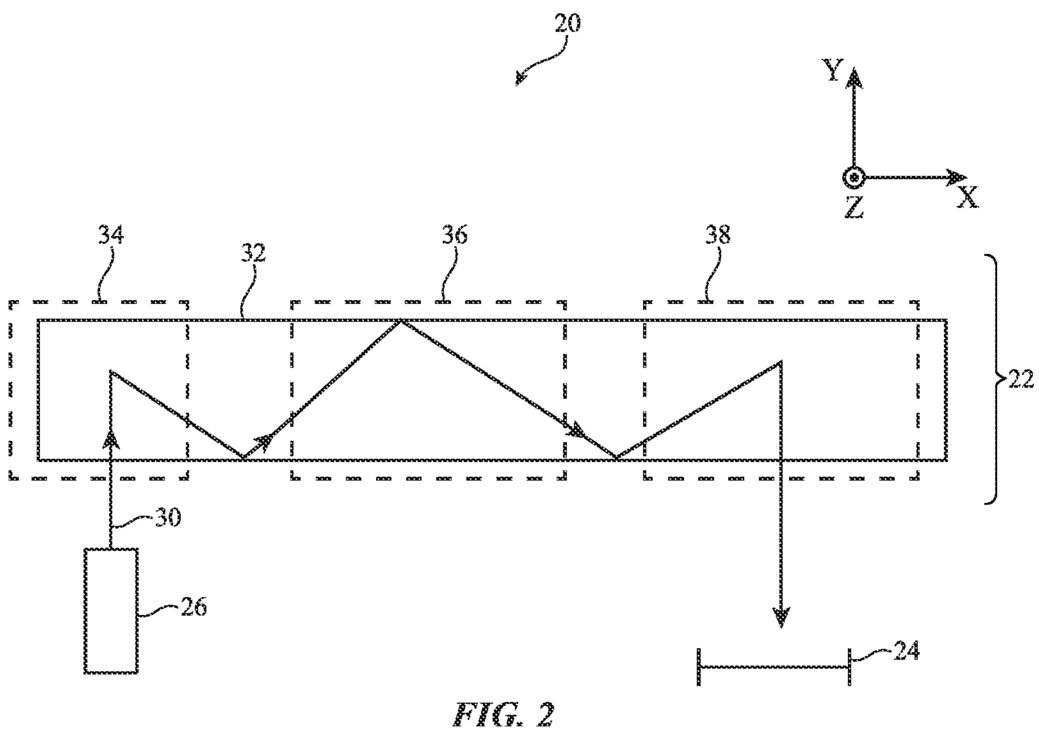
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction+Y towards optical system 22. When image light 30 strikes input coupler 34, input coupler 34 may redirect image light 30 so that the light propagates within waveguide 32 via total internal reflection towards output coupler 38 (e.g., in direction+X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 14B may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

Figure 3:
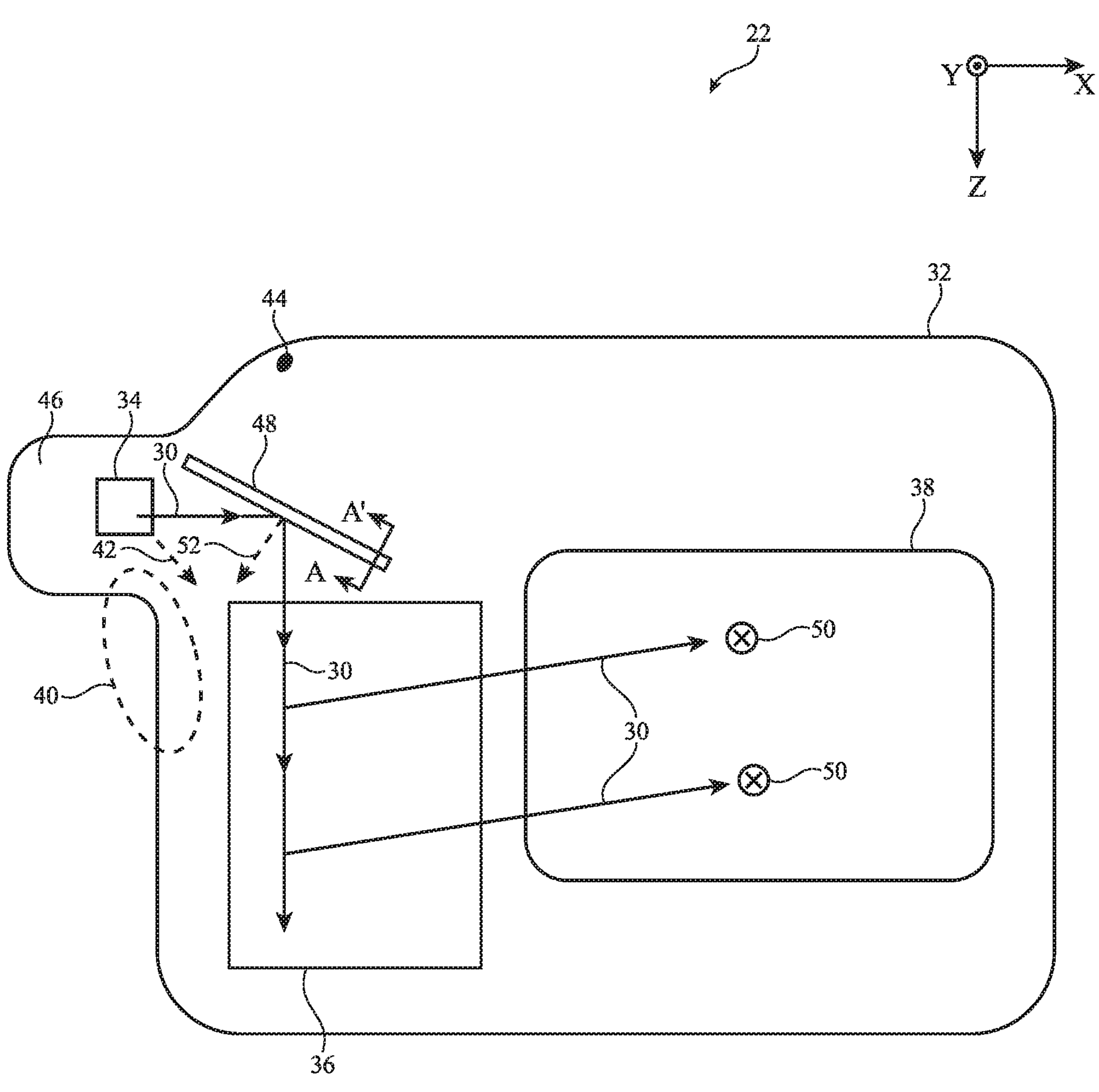
FIG. 3 is a front view of an illustrative waveguide having a reflector for redirecting light between an input coupler and a cross-coupler in accordance with some embodiments.

FIG. 3 is a front view of optical system 22. As shown in FIG. 3, input coupler 34, cross-coupler 36, and output coupler 38 may be disposed at or on different portions of waveguide 32. The location of output coupler 38 may be selected to align with eye box 24 (FIG. 2) to allow a user to view the image light coupled out of the waveguide. Waveguide 32 may have a protrusion such as temple portion 46. Temple portion 46 may be aligned with a temple portion of the housing for system 10. The opposing end of waveguide 32 may be aligned with, mounted to, mounted within, or otherwise coupled to a nose bridge portion of the housing for system 10.

The location of input coupler 34 may be selected to align with projector 26 (FIG. 2). As an example, input coupler 34 may be disposed at temple portion 46 of waveguide 32. This may allow projector 26 to be mounted within a temple portion of the housing of system 10, thereby allowing a user to wear system 10 on their head comfortably. Input coupler 34 may receive image light 30 from the projector and may couple the image light into waveguide 32 within a total internal reflection (TIR) range of the waveguide (e.g., a range of incident angles at which the light will continue to propagate along the waveguide via TIR).

In practice, it may be desirable for input coupler 34 to direct image light 30 directly towards cross-coupler 36, such as in the direction of arrow 42. However, if input coupler 34 were to couple image light 30 into waveguide 32 in the direction of arrow 42, at least some of the field of view (FOV) of the image light would be incident upon notch 40 in waveguide 32 (e.g., a gap, notch, or geometric feature defined by the edge of waveguide 32 where temple portion 46 of waveguide 32 meets the main body portion of waveguide 32). This may cause some of the light to undesirably scatter, be lost, and/or may undesirably reduce the size of the FOV of image light 30. Alternatively, input coupler 34 may be disposed on the main body portion of waveguide 32, such as at location 44. However, disposing input coupler 34 at location 44 would misalign input coupler 34 with respect to the output of projector 26 (FIG. 2) and/or would cause system 10 to become overly bulky and uncomfortable to wear for a user.

To mitigate these issues and to allow input coupler 34 to remain at or adjacent to temple portion 46 of waveguide 32, a reflector such as reflector 48 may be disposed on waveguide 32. In general, there may be an optical path for image light 30 that extends from input coupler 34 to cross-coupler 36 and from cross-coupler 36 to output coupler 38. Reflector 48 may be disposed on waveguide 32 and interposed on the optical path between input coupler 34 and cross-coupler 36. Reflector 48 may include one or more layers of reflective material (e.g., reflective layers or reflector layers). Reflector 48 may be partially reflective or completely reflective.

The location and orientation of reflector 48 may be selected such that reflector 48 receives the image light 30 coupled into waveguide 32 by input coupler 34 (e.g., where input coupler 34 is disposed on temple portion 46 of waveguide 32) and reflects the received image light towards cross-coupler 36. In other words, reflector 48 may redirect (reflect) the image light 30 coupled into waveguide 32 by input coupler 34 towards cross-coupler 36. For example, reflector 48 may have a lateral surface. The lateral surface may have a normal axis 52 oriented orthogonal to the lateral surface. The normal axis 52 may be oriented at a non-zero (non-parallel) angle with respect to both the X-axis and the Z-axis of FIG. 3. The lateral surface of reflector 48 may be oriented orthogonal to the lateral surface of waveguide 32 (e.g., the lateral surface may be orthogonal to the X-Z plane or, equivalently, normal axis 52 may lie within the X-Z plane) or the lateral surface of reflector 48 may be tilted at a non-perpendicular angle with respect to the lateral surface of waveguide 32 (e.g., the lateral surface may be oriented at a non-zero and non-perpendicular angle with respect to the X-Z plane or, equivalently, normal axis 52 may be lie outside of the X-Z plane). Image light 30 may be incident on reflector 48 at incident angles within the TIR range of the waveguide (e.g., because the incident image light has already been coupled into waveguide 32 by input coupler 34 by the time the image light reaches reflector 48). Reflector 48 may reflect image light 30 at output (reflected) angles within the TIR range of the waveguide, allowing the reflected light to propagate towards cross-coupler 36 via TIR within waveguide 32.

Cross-coupler 36 may receive the image light 30 reflected by reflector 48 and may redirect image light 30 towards output coupler 38 (e.g., via diffraction or reflection). Cross-coupler 36 may expand a pupil size of image light 30 upon redirection of the image light towards output coupler 38. Cross-coupler 36 may receive image light 30 at incident angles within the TIR range of the waveguide. Cross-coupler 36 may output (e.g., diffract or reflect) image light 30 at output angles within the TIR range of the waveguide (e.g., in implementations where output coupler 38 and cross-coupler 36 are disposed on the same substrate of waveguide 32) or at output angles outside the TIR range of the waveguide (e.g., in implementations where output coupler and cross-coupler 36 are disposed on different substrates of waveguide 32). Output coupler 38 may redirect (e.g., diffract or reflect) image light 30 out of waveguide 32 and towards the eye box (e.g., in the direction of arrows 50).

In this way, reflector 48 may allow an entirety of the FOV of image light 30 as coupled into waveguide 32 by input coupler 34 to reach cross-coupler 36 (e.g., without any of the FOV hitting notch 40) while allowing input coupler 34 to be located at a comfortable location that is aligned with the projector of system 10 (e.g., at temple portion 46 of waveguide 32). Reflector 48 may sometimes also be referred to herein as redirecting mirror 48, redirecting reflector 48, periscope mirror 48, or periscope reflector 48. Reflector 48 may include one or more coatings or layers of reflective material (e.g., a conductive mirror material, a dielectric mirror material, a multilayer thin-film mirror, etc.) on one or more substrates of waveguide 32 or may include an edge facet of one or more substrates of waveguide 32, as examples.

Figure 4:
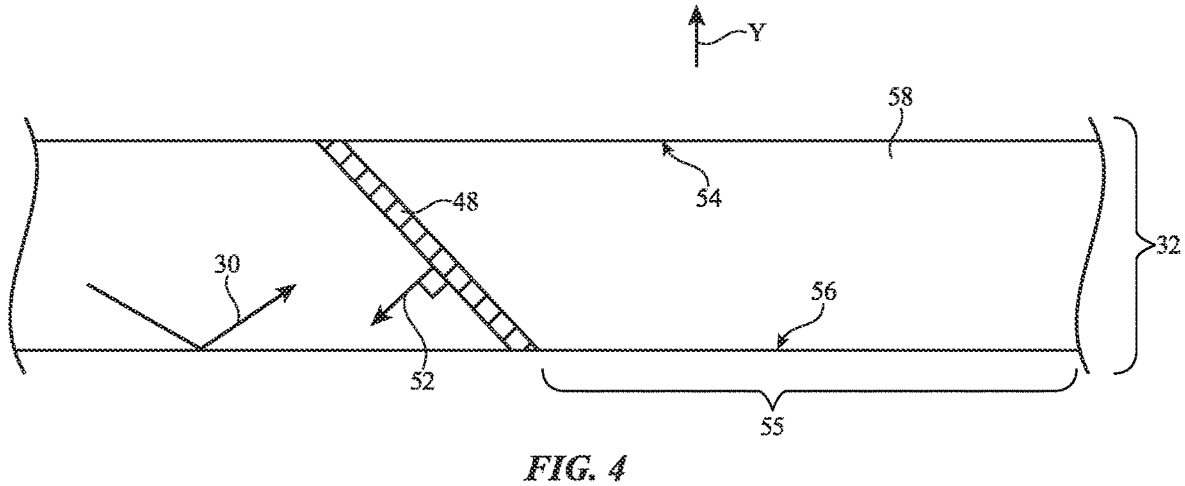
FIG. 4 is a cross-sectional side view of an illustrative reflector that is tilted with respect to a lateral surface of a waveguide in accordance with some embodiments.

FIG. 4 is a cross-sectional side view of waveguide 32 (e.g., as taken in the direction of line AA' of FIG. 3) showing one example of how reflector 48 may be tilted or slanted with respect to a lateral surface of waveguide 32. As shown in FIG. 4, waveguide 32 may include a waveguide substrate such as substrate 58. Substrate 58 may have a first lateral surface 54 and an opposing second lateral surface 56 (e.g., lateral surfaces of the waveguide). Lateral surfaces 54 and 56 may be oriented substantially orthogonal to the Y-axis.

Reflector 48 may be disposed or embedded within waveguide 32. Cross-coupler 36 (FIG. 3) may also be disposed on or embedded within waveguide 32. Reflector 48 may be tilted, slanted, oriented, or rotated at a non-zero angle with respect to the lateral surfaces of waveguide 32. For example, the lateral surface of reflector 48 may be oriented at a non-parallel and non-perpendicular angle with respect to the Y-axis. The lateral surface of reflector 48 may also be oriented at a non-parallel and non-perpendicular angle with respect to lateral surfaces 54 and 56 of substrate 58. Normal axis 52 of reflector 48 may be oriented at non-parallel and non-perpendicular angle with respect to lateral surfaces 54 and 56 and the Y-axis.

Image light 30 propagating along substrate 58 via TIR (e.g., as coupled into substrate 58 by input coupler 34 of FIG. 3) may hit reflector 48. Reflector 48 may redirect image light 30 by reflecting the image light. Reflector 48 may receive image light 30 at an incident angle with respect to normal axis 52 and may reflect image light 30 at a reflected (output) angle that is equal to the incident angle but at an opposing side of normal axis 52 from the incident angle, for example. Reflector 48 may redirect image light 30 towards cross-coupler 36 while also reflecting the image light more downwards towards lateral surface 56 than in implementations where reflector 48 is oriented orthogonal to the surfaces of waveguide 32.

Figure 5:
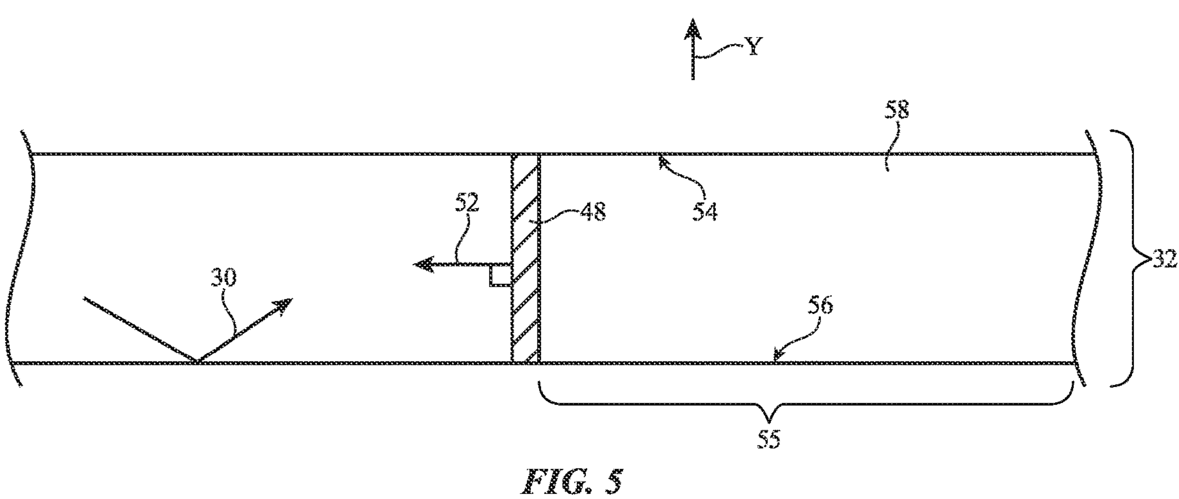
FIG. 5 is a cross-sectional side view of an illustrative reflector that is orthogonal to a lateral surface of a waveguide in accordance with some embodiments.

The example of FIG. 4 is merely illustrative. If desired, reflector 48 may be oriented orthogonal to the lateral surfaces of waveguide 32. FIG. 5 is a cross-sectional side view of waveguide 32 (e.g., as taken in the direction of line AA' of FIG. 3) showing one example of how reflector 48 may be oriented orthogonal to the lateral surfaces of waveguide 32.

As shown in FIG. 5, reflector 48 may be disposed or embedded within substrate 58 such that normal axis 52 is oriented parallel to lateral surfaces 54 and 56 and orthogonal to the Y-axis. Put differently, the lateral surface of reflector 48 may be oriented parallel to the Y-axis and orthogonal to lateral surfaces 54 and 56. Image light 30 propagating along substrate 58 via TIR (e.g., as coupled into substrate 58 by input coupler 34 of FIG. 3) may hit reflector 48. Reflector 48 may redirect image light 30 by reflecting the image light. Reflector 48 may redirect image light 30 towards cross-coupler 36.

Figure 6:
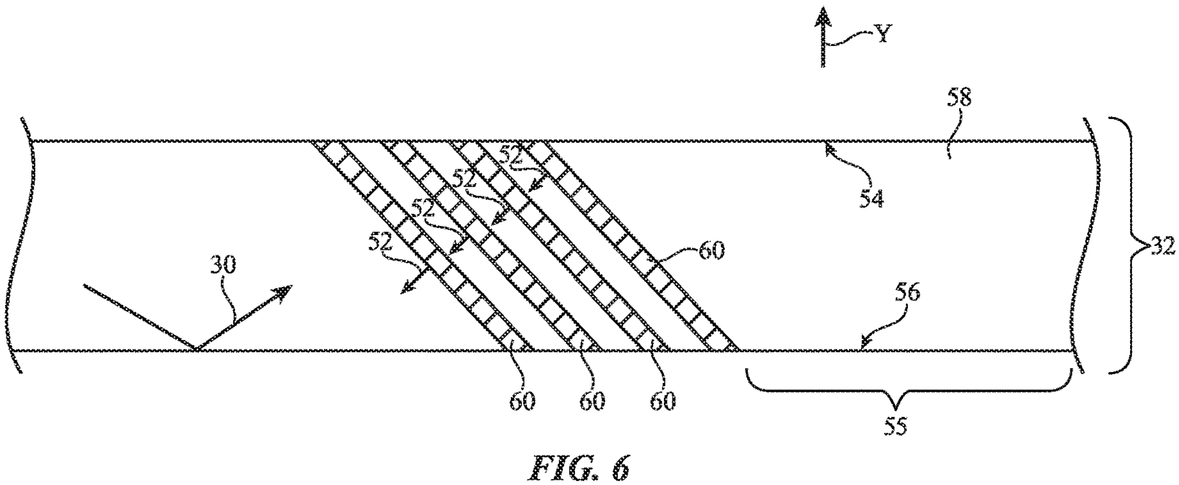
FIG. 6 is a cross-sectional side view of an illustrative reflector having multiple reflective layers in accordance with some embodiments.

In the examples of FIGS. 4 and 5, reflector 48 includes a single layer or coating of reflective material (e.g., a single reflector). If desired, reflector 48 may include multiple parallel partial reflective layers. FIG. 6 is a cross-sectional side view of waveguide 32 (e.g., as taken in the direction of line AA' of FIG. 3) showing one example of how reflector 48 may include multiple parallel partial reflective layers.

As shown in FIG. 6, reflector 48 may include two or more partially reflective layers 60 disposed or embedded in substrate 58. Each partially reflective layer 60 may have a normal axis 52 oriented parallel to the normal axis 52 of the other partially reflective layers 60 in reflector 48. Similarly, the lateral surfaces of each partially reflective layer 60 in reflector 48 may be parallel. Each partially reflective layer 60 may include a dielectric coating, a conductive coating, or any other desired layer(s) of reflective material. Reflector 48 may sometimes be referred to herein as a louvered mirror or a partially reflective louvered mirror in this implementation (e.g., partially reflective layers 60 may be louvered mirror layers). In the example of FIG. 6, reflector 48 and partially reflective layers 60 are tilted or slanted with respect to lateral surfaces 54 and 56. This is merely illustrative and, if desired, reflector 48 and partially reflective layers 60 may be orthogonal to lateral surfaces 54 and 56 (e.g., similar to the reflector 48 shown in FIG. 5). Implementing reflector 48 using two or more partially reflective layers 60 may, for example, help to expand pupil size and improve uniformity of the light exiting the waveguide.

Image light 30 propagating along substrate 58 via TIR (e.g., as coupled into substrate 58 by input coupler 34 of FIG. 3) may hit reflector 48. Each partially reflective layer 60 may reflect some of image light 30 while also transmitting some of image light 30 to the next partially reflective layer 60 in reflector 48. This may configure each partially reflective layer 60 in reflector 48 to redirect some of image light 30 towards cross-coupler 36 (FIG. 3).

Figure 7:
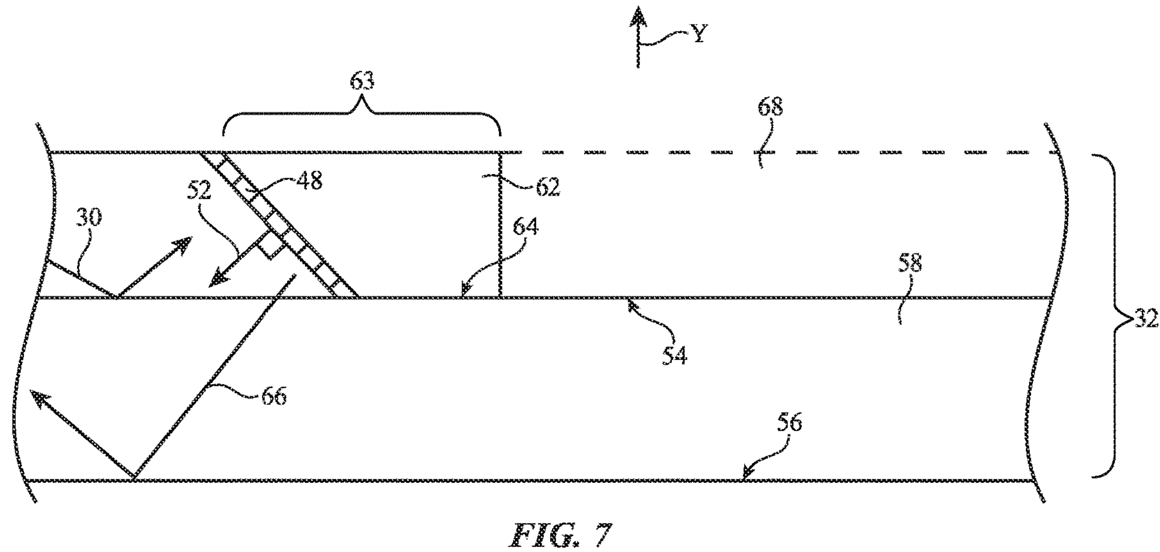
FIG. 7 is a cross-sectional side view of an illustrative reflector disposed in a first waveguide substrate stacked on a second waveguide substrate that includes a cross-coupler in accordance with some embodiments.

In examples of FIGS. 4-6, reflector 48 is disposed in the same substrate of waveguide 32 as cross-coupler 36 (e.g., cross-coupler 36 and reflector 48 may both be disposed within substrate 58 of FIGS. 4-6). If desired, reflector 48 may be disposed in a separate substrate of waveguide 32 from cross-coupler 36. FIG. 7 is a cross-sectional side view of waveguide 32 (e.g., as taken in the direction of line AA' of FIG. 3) showing one example of how reflector 48 may be disposed in a separate substrate of waveguide 32 from cross-coupler 36.

As shown in FIG. 7, waveguide 32 may include an additional waveguide substrate such as substrate 62. Substrate 62 may have a lateral surface 64 mounted to lateral surface 54 of substrate 58. Substrate 62 may extend across (overlap) a portion of substrate 58 (as shown in FIG. 7) or may extend across (overlap) all of substrate 58, as shown by dashed box 68.

Cross-coupler 36 (FIG. 3) may be disposed on or in substrate 58. Reflector 48 may be disposed on or in substrate 62. Reflector 48 may be oriented at a non-zero angle with respect to lateral surfaces 64, 54, and 56 (as shown in FIG. 7) or may be oriented orthogonal to lateral surfaces 64, 54, and 56 if desired (e.g., as shown in FIG. 5). If desired, reflector 48 may include multiple partially reflective layers embedded within substrate 62 (e.g., as shown in FIG. 6).

Image light 30 may propagate along substrate 62 via TIR (e.g., as coupled into substrate 62 by input coupler 34 of FIG. 3). The image light 30 may hit reflector 48 in substrate 62 (e.g., at incident angles within the TIR range of substrate 62). Reflector 48 may reflect image light 30 towards cross-coupler 36 (FIG. 3). Reflector 48 may, for example, reflect image light 30 at reflected angles that lie outside of the TIR range of substrate 62, thereby allowing image light 30 to be coupled out of substrate 62 and into substrate 58 (e.g., at incident angles within the TIR range of substrate 58). The image light 30 may then propagate along substrate 58 via TIR until the image light hits the cross-coupler.

The examples of FIGS. 4-7 in which reflector 48 is embedded within waveguide 32 are merely illustrative. If desired, reflector 48 may be formed from a reflective edge of waveguide 32 (sometimes referred to herein as a reflective edge facet). The reflective edge of waveguide 32 may include a reflective edge or edge facet of one of the substrates in waveguide 32 (e.g., substrate 58 of FIGS. 4-6 or substrate 62 of FIG. 7). The reflective edge may be an edge extending from one lateral surface of the substrate to the other (e.g., an edge extending from lateral surface 54 to lateral surface 56 of substrate 58 of FIGS. 4-6 or from lateral surface 64 to the opposing lateral surface of substrate 62 of FIG. 7). For example, portion 55 of substrate 58 in FIGS. 4-6 may be removed to form reflector 48 from a reflective edge or edge facet of substrate 58. Similarly, portion 62 of substrate 62 in FIG. 7 may be removed to form reflector 48 from a reflective edge or edge facet of substrate 62.

In some implementations, input coupler 34 (FIG. 3) may include an input coupling prism mounted to substrate 62 (FIG. 7), mounted to substrate 58 (FIGS. 4-7), or mounted to an additional substrate in waveguide 32. In other implementations, input coupler 34 may include an SRG on substrate 58 (FIGS. 4-7), on substrate 62 (FIG. 7), or on an additional substrate in waveguide 32. In other implementations, input coupler 34 may include holograms (e.g., volume holograms), a mirror, or a louvered partially reflective mirror in substrate 58 (FIGS. 4-7), in substrate 62 (FIG. 7), or in an additional substrate in waveguide 32.

In some implementations, cross-coupler 36 (FIG. 3) may include a louvered partially reflective mirror in substrate 58 (FIGS. 4-7) or in additional substrate in waveguide 32. In other implementations, cross-coupler 36 may include an SRG on substrate 58 (FIGS. 4-7) or on an additional substrate in waveguide 32. In other implementations, cross-coupler 36 may include holograms (e.g., volume holograms) in substrate 58 (FIGS. 4-7) or in an additional substrate in waveguide 32.

In some implementations, output coupler 38 (FIG. 3) may include a louvered partially reflective mirror in substrate 58 (FIGS. 4-7) or in additional substrate in waveguide 32. In other implementations, output coupler 38 may include an SRG on substrate 58 (FIGS. 4-7) or on an additional substrate in waveguide 32. In other implementations, cross-coupler 36 may include holograms (e.g., volume holograms), a mirror, or a louvered partially reflective mirror in substrate 58 (FIGS. 4-7) or in an additional substrate in waveguide 32. In implementations where one of couplers 34-38 is formed from an SRG, two or all of couplers 34-38 may be formed from SRGs in the same layer of SRG medium as the other of couplers 34-38, if desired. Any desired combination of the implementations of FIGS. 4-7 and for input coupler 34, cross-coupler 36, and output coupler 38 may be used.

Figure 8:
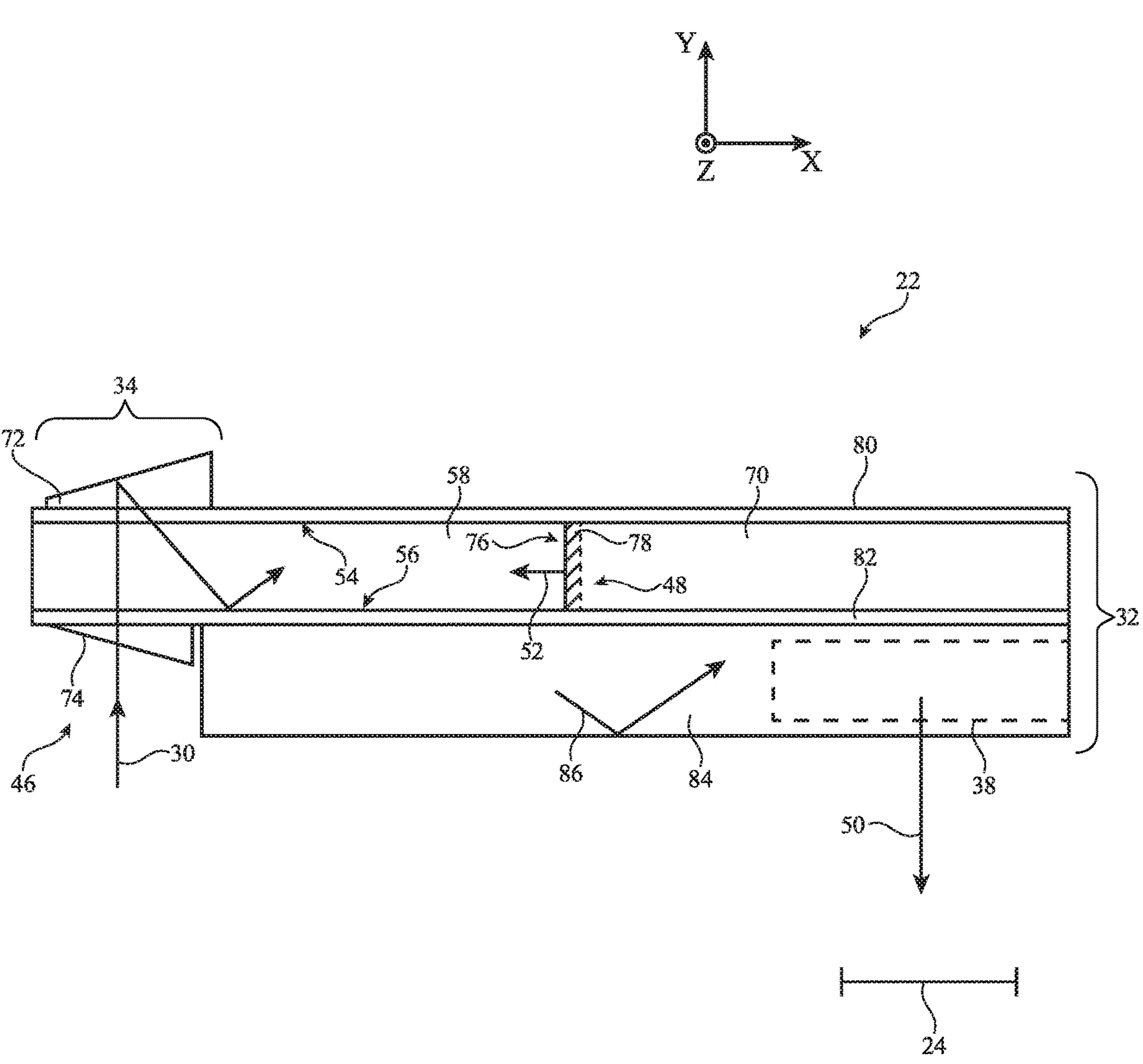
FIG. 8 is a cross-sectional bottom view of an illustrative waveguide having a reflector formed from an edge facet of a waveguide substrate in accordance with some embodiments.

FIG. 8 is a cross-sectional bottom view of waveguide 32 (FIG. 3) showing one illustrative implementation in which input coupler 34 includes an input coupling prism on substrate 58, cross-coupler 36 is disposed within substrate 58, output coupler 38 is disposed in an additional substrate mounted to substrate 58, and reflector 48 is formed from a reflective edge facet of substrate 58.

As shown in FIG. 8, a first cover layer 80 may be mounted to lateral surface 54 of substrate 58 and a second cover layer 82 may be mounted to lateral surface 56 of substrate 58 (e.g., substrate 58 may be sandwiched between cover layers 80 and 82). Cover layers 80 and 82 may be protective cover layers that help to protect the optical structures on substrate 58 from damage, for example. Substrate 58 may have an edge facet 76 extending from lateral surface 54 to lateral surface 56. Reflector 48 may include edge facet 76. If desired, reflector 48 may include a layer or coating 78 of reflective or partially reflective material on edge facet 76 to help increase the reflectivity of reflector 48. If desired, waveguide 32 may have a plug substrate 70 (sometimes referred to herein as optical plug 70 or plug 70) that is edge-coupled substrate 58 (e.g., plug substrate 70 may be sandwiched between cover layers 80 and 82).

Input coupler 34 may include an input coupling prism 72 mounted to lateral surface 54 of substrate 58 (e.g., cover layer 80). Input coupling prism 72 is a reflective input coupling prism in this example. In other implementations, input coupling prism 72 may be a transmissive input coupling prism. A dispersion compensating optical wedge such as wedge 74 may be mounted to lateral surface 56 of substrate 58 (e.g., cover layer 56) overlapping input coupling prism 72. Cross-coupler 36 (FIG. 3) may also be embedded in substrate 58.

Waveguide 32 may include an additional layer of substrate such as substrate 84. Substrate 84 may be mounted to lateral surface 56 of substrate 58 (e.g., cover layer 82). Substrate 84 may overlap substrate 58 (e.g., the portion of substrate 58 outside of temple portion 46) and may overlap plug substrate 70. Substrate 84 may be located on the user-facing side of waveguide 32 whereas substrate 58 is located on the world-facing side of waveguide 32, for example. Substrate 84 may include a layer of grating medium (holographic recording medium). Output coupler 38 may be disposed in substrate 84. Output coupler 38 may, for example, include a mirror embedded in substrate 84, a louvered partially reflective mirror embedded in substrate 84, or volume holograms recorded in substrate 84, as examples.

Image light 30 from projector 26 (FIG. 2) may pass through wedge 74 and substrate 58 to the reflective surface of input coupling prism 72. The reflective surface of input coupling prism 72 may couple image light 30 into substrate 58 (e.g., at angles within the TIR range of substrate 58). Wedge 74 may serve to mitigate/reverse subsequent dispersion in image light 30 produced by input coupling prism 72. Image light 30 may propagate along substrate 58 via total internal reflection. Image light may be incident upon reflector 48 (e.g., edge facet 76). Reflector 48 may reflect (redirect) the incident image light towards the cross-coupler 36 in substrate 58 (e.g., in a direction parallel to the Z-axis or in a direction within the X-Z plane that is oriented at a non-zero angle with respect to the X-axis). In the example of FIG. 8, edge facet 76 is orthogonal to lateral surfaces 54 and 56 (e.g., the normal axis 52 of reflector 48 lies in the X-Z plane). This is merely illustrative and, if desired, edge facet 76 and reflector 48 may be tilted with respect to lateral surfaces 54 and 56 (e.g., as shown in FIG. 4) such that normal axis 52 is also oriented within the X-Y plane at a non-zero angle with respect to the X-axis.

Cross-coupler 36 may receive the reflected image light from reflector 48. Cross-coupler 36 may redirect (e.g., reflect or diffract) the image light towards output coupler 38 in substrate 84. For example, cross-coupler 36 may output the image light at angles outside the TIR range of substrate 58 and inside the TIR range of substrate 84, causing the image light to couple out of substrate 58 and into substrate 84 (as shown by arrow 86). The image light may then propagate down substrate 84 via TIR until hitting output coupler 38. Output coupler 38 may couple the image light out of substrate 84 and thus waveguide 32 towards eye box 24, as shown by arrow 50.

Figure 9:
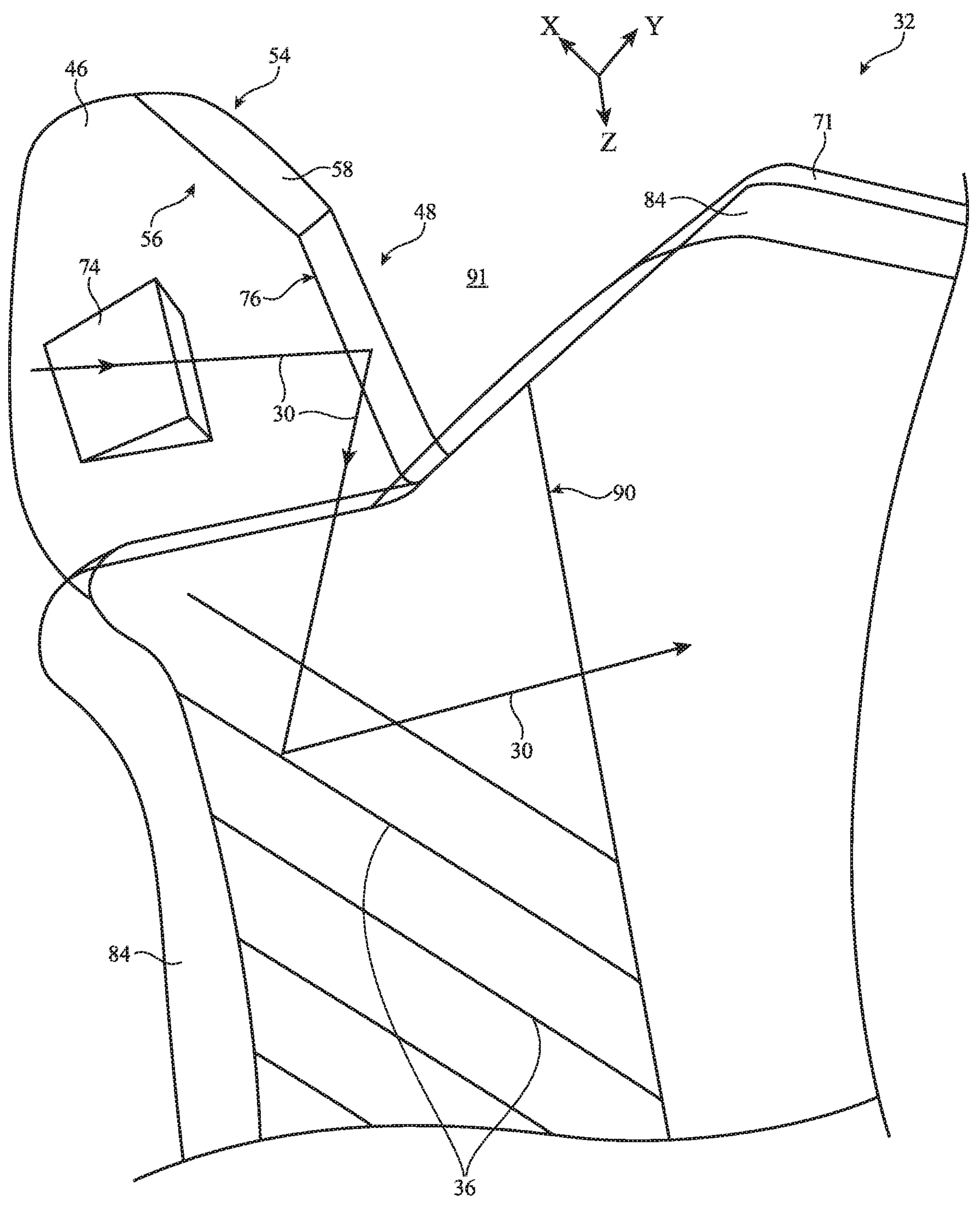
FIG. 9 is a rear perspective view of an illustrative waveguide having a reflector formed from an edge facet of a waveguide substrate in accordance with some embodiments.

FIG. 9 is a perspective view of waveguide 32 in the illustrative implementation of FIG. 8 in which input coupler 34 includes an input coupling prism on substrate 58, cross-coupler 36 is disposed within substrate 58, output coupler 38 is disposed in an additional substrate mounted to substrate 58, and reflector 48 is formed from a reflective edge facet of substrate 58.

As shown in FIG. 9, substrate 58 may be edge-coupled to an additional substrate such as plug substrate 71 (e.g., at edge-coupling joint 90). Plug substrate 70 (FIG. 8) may be disposed within notch 91 between plug substrate 71 and substrate 58 but has been omitted from FIG. 9 for the sake of clarity. Cover layers 80 and 82 have also been omitted from FIG. 9 for the sake of clarity. Optical wedge 74 of input coupler 34 may be mounted to lateral surface 56 of substrate 58 (e.g., within temple region 46 of waveguide 32).

Reflector 48 may be formed from edge facet 76 of substrate 58. Edge facet 76 and thus reflector 48 may be oriented at a non-zero angle with respect to the Z-axis of FIG. 9. Edge facet 76 may be orthogonal to lateral surfaces 56 and 54 or may be tilted at a non-orthogonal angle with respect to lateral surfaces 56 and/or 54. Cross-coupler 36 may be disposed in substrate 58 (e.g., as a partially reflective louvered mirror in the implementation of FIG. 9). Substrate 84 for output coupler 38 (e.g., a layer of holographic recording medium) may be layered over substrate 58 and plug substrate 71

As shown in FIG. 9, image light 30 may pass through wedge 74 and may be coupled into substrate 58. Image light 30 may propagate down substrate 58 via TIR until hitting edge facet 76 and thus reflector 48. Reflector 48 may reflect image light 30 downwards (e.g., in the Z-direction) towards cross-coupler 36 (e.g., at angles that remain within the TIR range of substrate 58). The reflected image light may propagate down substrate 58 via TIR until hitting cross-coupler 36. Cross-coupler 36 may redirect image light 30 towards output coupler 38 in substrate 84. The examples of FIGS. 8 and 9 are merely illustrative and, in general, other waveguide architectures may be used.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, pLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A display comprising:

a waveguide, wherein the waveguide comprises:

a first substrate having a first lateral surface and a second lateral surface opposite the first lateral surface; and a second substrate mounted to the first lateral surface of the first substrate, wherein the second substrate overlaps some but not all of the first lateral surface of the first substrate;

a first optical coupler configured to couple light into the waveguide;

a second optical coupler on the waveguide, wherein the second optical coupler is disposed on the first substrate;

a third optical coupler on the waveguide; and a reflector on the waveguide, wherein the reflector is disposed on the second substrate and the reflector has a lateral surface tilted at a non-orthogonal angle with respect to the first lateral surface, and wherein the reflector is configured to redirect, towards the second optical coupler, the light coupled into the waveguide by the first optical coupler, the second optical coupler is configured to redirect, towards the third optical coupler, the light reflected by the reflector, and the third optical coupler is configured to couple the light out of the waveguide.

2. The display of claim 1, wherein the second optical coupler is configured to expand a pupil of the light.

3. A display comprising:

a waveguide, wherein the waveguide comprises:

a first substrate having a first lateral surface and a second lateral surface opposite the first lateral surface; and a second substrate mounted to the first lateral surface of the first substrate, wherein the second substrate overlaps some but not all of the first lateral surface of the first substrate;

a first optical coupler configured to couple light into the waveguide;

a second optical coupler on the waveguide, wherein the second optical coupler is disposed on the first substrate;

a third optical coupler on the waveguide; and a reflector on the waveguide, wherein the reflector is disposed on the second substrate and comprises a set of parallel partially reflective layers, and wherein the reflector is configured to redirect, towards the second optical coupler, the light coupled into the waveguide by the first optical coupler, the second optical coupler is configured to redirect, towards the third optical coupler, the light reflected by the reflector, and the third optical coupler is configured to couple the light out of the waveguide.

4. A display comprising:

a waveguide, wherein the waveguide comprises:

a first substrate having a first lateral surface and a second lateral surface opposite the first lateral surface; and a second substrate mounted to the first lateral surface of the first substrate, wherein the second substrate overlaps some but not all of the first lateral surface of the first substrate;

a first optical coupler configured to couple light into the waveguide;

a second optical coupler on the waveguide, wherein the second optical coupler is disposed on the first substrate;

a third optical coupler on the waveguide; and a reflector on the waveguide, wherein the reflector is disposed on the second substrate and comprises an edge facet of the second substrate, and wherein the reflector is configured to redirect, towards the second optical coupler, the light coupled into the waveguide by the first optical coupler, the second optical coupler is configured to redirect, towards the third optical coupler, the light reflected by the reflector, and the third optical coupler is configured to couple the light out of the waveguide.

5. A display comprising:

a waveguide, wherein the waveguide comprises a substrate having a first lateral surface and a second lateral surface opposite the first lateral surface;

an input coupler configured to couple light into the waveguide and comprising:

a reflective input coupling prism mounted to the first lateral surface of the substrate, and a dispersion compensation wedge mounted to the second lateral surface and at least partially overlapping the input coupling prism;

a reflector on the substrate and configured to reflect the light coupled into the waveguide by the input coupler;

a cross-coupler configured to redirect the light reflected by the reflector; and an output coupler configured to couple, out of the waveguide, the light redirected by the cross-coupler.

6. The display of claim 5, wherein the cross-coupler comprises a surface relief grating, a volume hologram, or a mirror.

7. The display of claim 5, wherein the output coupler comprises a surface relief grating, a volume hologram, or a mirror.

8. A display comprising:

a substrate having a first lateral surface, a second lateral surface, and an edge facet extending from the first lateral surface to the second lateral surface;

a first optical coupler configured to couple light into the substrate and towards the edge facet, wherein the first optical coupler comprises a prism with a surface facing the first lateral surface and a reflective surface, and wherein the reflective surface is configured to reflect the light into the substrate through the surface facing the first lateral surface;

a second optical coupler on the substrate, the edge facet being configured to reflect the light towards the second optical coupler and the second optical coupler being configured to redirect the light; and a third optical coupler configured to receive the light from the second optical coupler and configured to redirect the light.

9. The display of claim 8, further comprising:

an additional substrate layered onto the second lateral surface of the substrate, the third optical coupler being disposed on the additional substrate and being configured to couple the light out of the additional substrate, wherein the second optical coupler comprises a louvered mirror, and the third optical coupler comprises volume holograms.

10. The display of claim 8, wherein the first optical coupler further comprises a wedge configured to compensate for dispersion of the light, mounted to the second lateral surface, and at least partially overlapping the prism.

11. The display of claim 10, wherein the wedge at least partially overlaps the prism.

* * * * *